United States Patent
Krauss et al.

(10) Patent No.: US 6,393,115 B1
(45) Date of Patent: May 21, 2002

(54) METHOD FOR DETECTING AND PROCESSING INFORMATION RELEVANT TO ESTABLISHING A TELEPHONE CONNECTION IN A CTI SYSTEM AND CORRESPONDING CTI SYSTEM

(75) Inventors: Dietmar Krauss; Uwe Krüger, both of Essen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/646,496

(22) PCT Filed: Mar. 3, 1999

(86) PCT No.: PCT/DE99/00559

§ 371 Date: Sep. 18, 2000

§ 102(e) Date: Sep. 18, 2000

(87) PCT Pub. No.: WO99/48265

PCT Pub. Date: Sep. 23, 1999

(30) Foreign Application Priority Data

Mar. 18, 1998 (DE) .......................................... 198 11 829

(51) Int. Cl.[7] .......................... H04M 3/42; H04M 11/00; G06F 7/00; G09G 5/00
(52) U.S. Cl. .............................. 379/201.01; 379/93.17; 707/3; 345/839
(58) Field of Search ................................ 379/266, 265, 379/309, 207, 216, 218

(56) References Cited

U.S. PATENT DOCUMENTS

| 5,202,828 A | | 4/1993 | Vertelney et al. |
| 5,315,705 A | | 5/1994 | Iwami et al. |
| 5,655,015 A | | 8/1997 | Walsh et al. |
| 5,838,458 A | * | 11/1998 | Tsai ............................. 358/402 |
| 5,923,736 A | * | 7/1999 | Shachar .................... 379/93.17 |
| 5,946,386 A | * | 8/1999 | Rogers et al. .............. 379/265 |
| 5,982,370 A | * | 11/1999 | Kamper ..................... 345/356 |
| 6,018,571 A | * | 1/2000 | Langlois et al. ........... 379/207 |
| 6,237,025 B1 | * | 5/2001 | Ludwig et al. ............. 709/204 |

FOREIGN PATENT DOCUMENTS

| EP | 0 822 698 A2 | 2/1998 |
| EP | 0 824 295 A2 | 2/1998 |
| WO | WO 97/35416 | 9/1997 |

* cited by examiner

*Primary Examiner*—Ahmad F. Matar
*Assistant Examiner*—Hector Agdeppa
(74) *Attorney, Agent, or Firm*—Schiff Hardin & Waite

(57) ABSTRACT

A method is provided for determining and processing items of information that are relevant for setting up a telephone connection in a CTI (Computer Telephony Integration) system, as well as corresponding CTI system. A user of the CTI system can at will mark character strings shown on a display screen (11) of the computer (4) of the CTI system, which strings can in particular be independent of the programs respectively running on the computer (4). The character string marked by the user is automatically evaluated and is differently processed dependent on its content, that is, dependent on whether it is a string of numerals or a string of letters, so that, for example, given the presence of a string of numerals the call number corresponding to the string of numerals is automatically dialed via the CTI system, and given the presence of a string of letters an entry in a database corresponding to the string of letters can automatically be sought, in order subsequently to read out from the database the call number corresponding to the string of letters, and to dial this number.

22 Claims, 4 Drawing Sheets

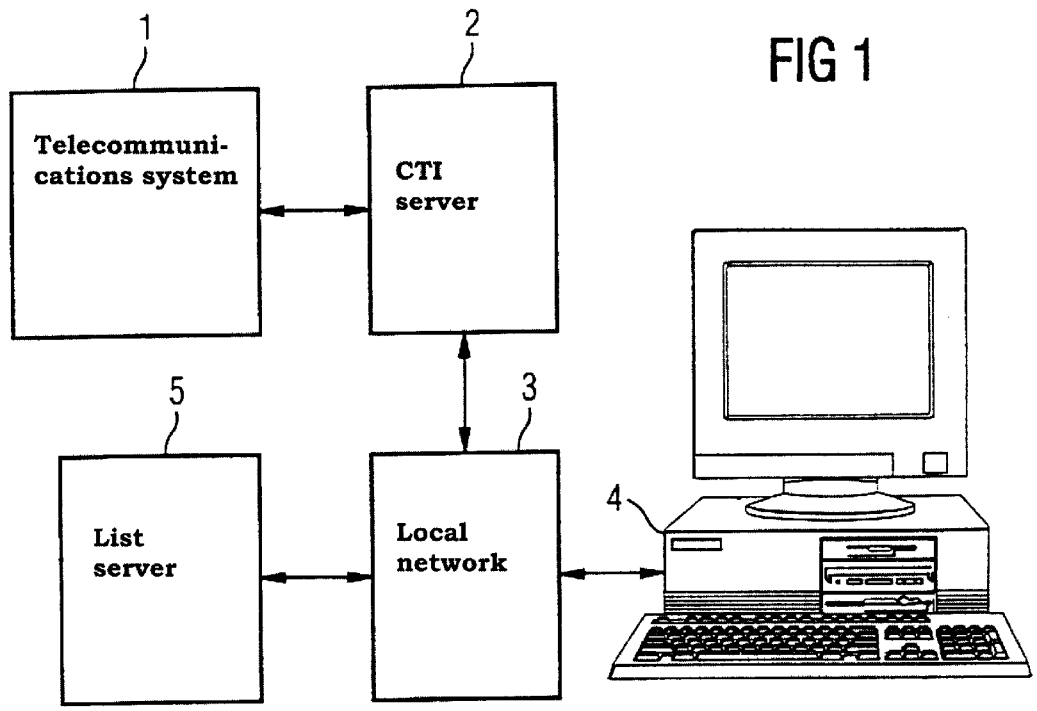
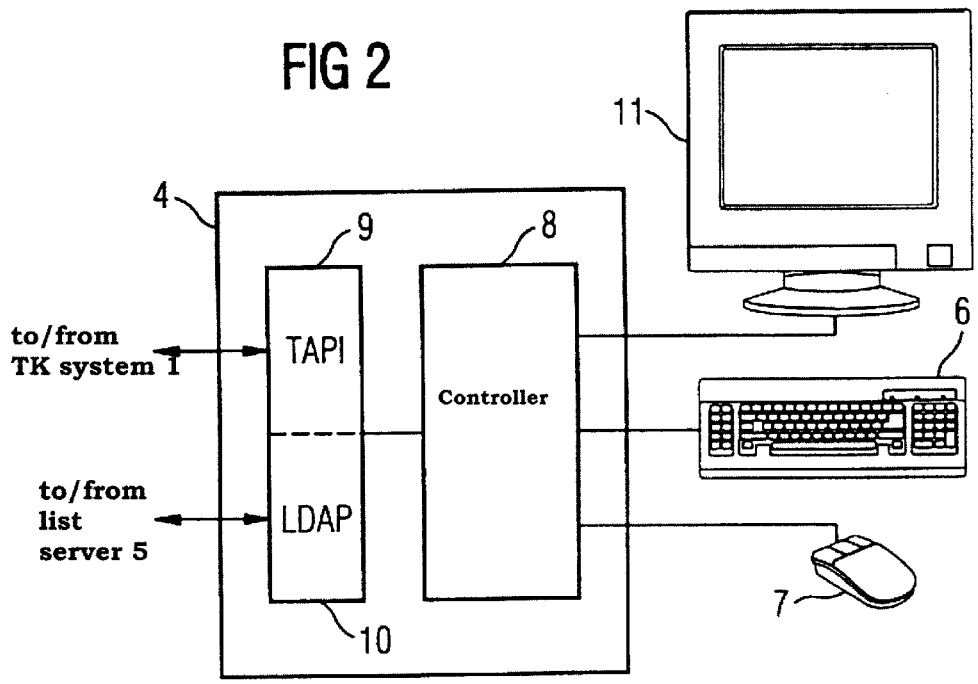

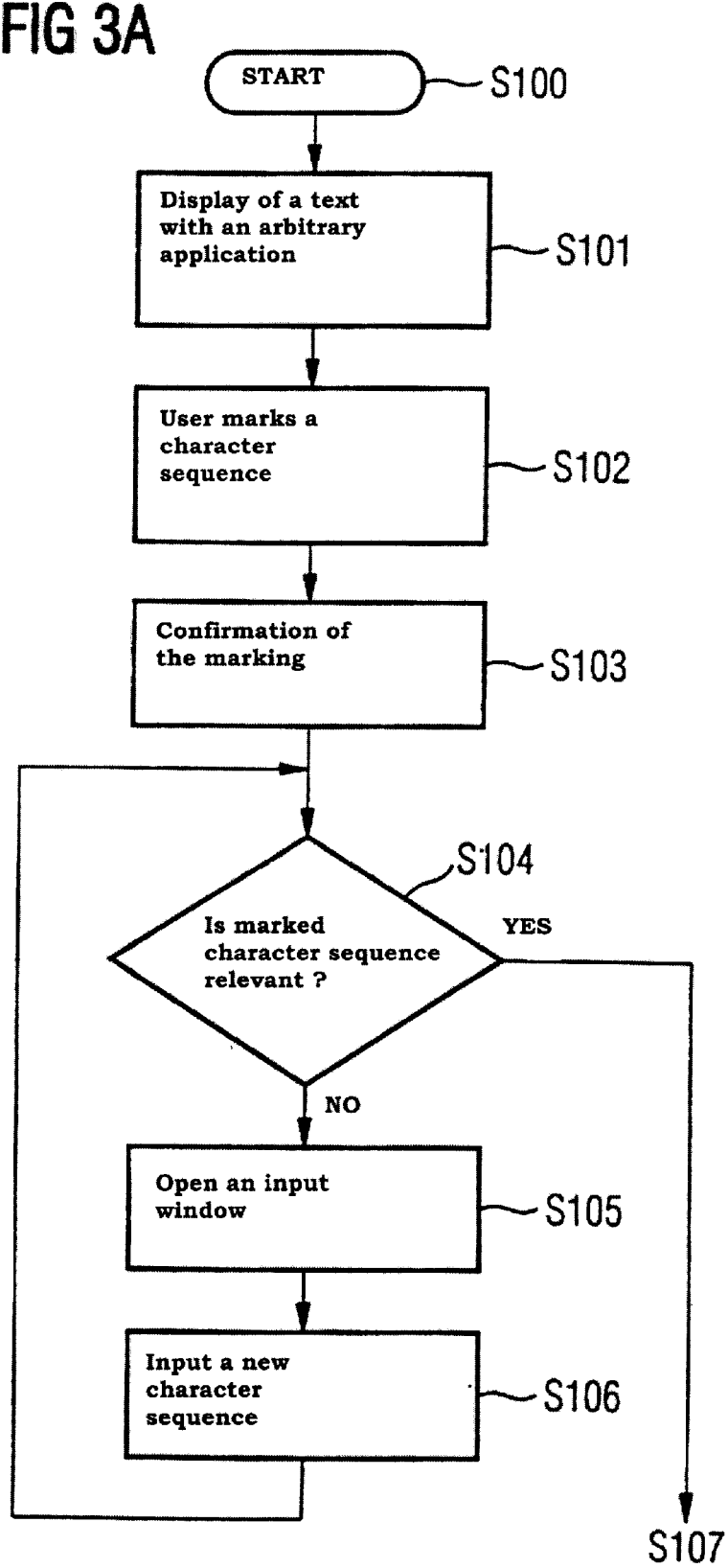

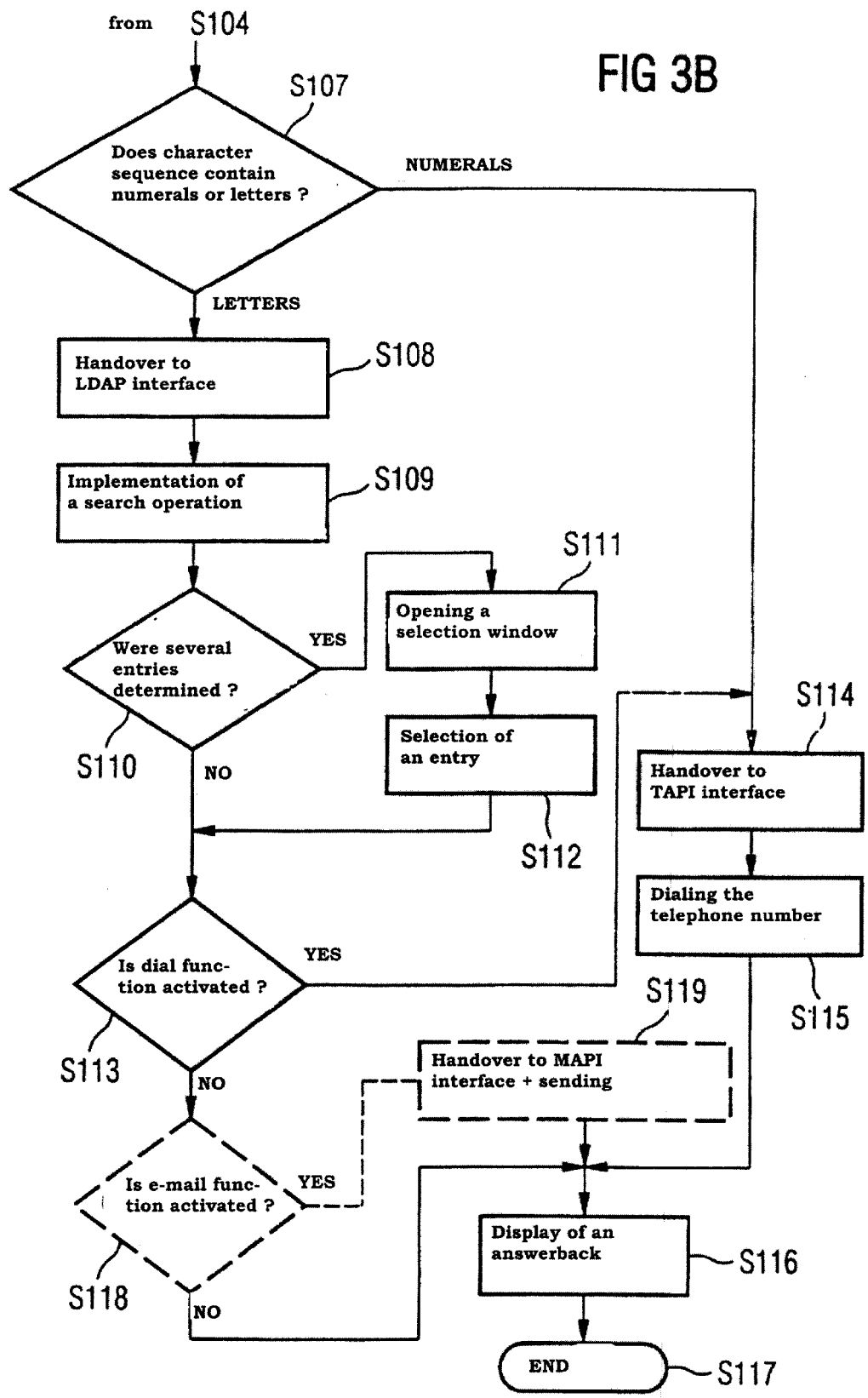

FIG 4a  This is a text containing a telephone number.
It reads +49 201 816-3389 and should be dialed.

FIG 4b  ....tet +49 201 8|16-3389 un....

FIG 4c  Telephone number +49 201 816-3389 is dialed

FIG 4d  Telephone number [                    ]

FIG 5a  Mr. Max Mustermann should be called

FIG 5b  ...x Muste|mann sol...

FIG 5c  Telephone +49 201 816-3389 is dialed

FIG 5d  Name: [                    ]

FIG 5e  Please select a name:

Mustermann, Heinz
Mustermann, Max
Mustermann, Renate
Mustermann, Theo

METHOD FOR DETECTING AND PROCESSING INFORMATION RELEVANT TO ESTABLISHING A TELEPHONE CONNECTION IN A CTI SYSTEM AND CORRESPONDING CTI SYSTEM

BACKGROUND OF THE INVENTION

1. Field of the Invention

The present invention relates to a method for determining and processing items of information that are relevant for setting up a telephone connection in a CTI system, as well as a CTI system in which a method of this sort is used.

2. Description of the Related Art

CTI (Computer Telephony Integration) stands for the connection of computer technology on the one hand with telephone technology on the other hand, that is, for computer-supported telecommunication. Through the application of computer technology, calls can be controlled so that computer-supported call number dialing, call monitoring, or call forwarding is possible. In addition, with the use of CTI technology, computer-supported processing of items of information transmitted as a result of a telecommunication connection is possible, so that a computer-supported data transmission, speech recognition, or tone production can be executed.

In the design of CTI systems, in principle a distinction is made between two different types of CTI systems. Thus, on the one hand a direct coupling of a computer (personal computer) with a telephone terminal device is conceivable, while on the other hand what is known as a client/server solution can be used, according to which a computer is connected via a local network (local area network, LAN) with a CTI server, which in turn is connected directly to a telecommunication installation (TC installation). The design of CTI systems has a significant influence on the type of call controlling. Whereas, given a direct coupling between a computer and a telephone terminal device, the computer can control only the telephone connected thereto (known as first-party call control), with the use of the client/server solution it is additionally possible to control a plurality of telephones, and a corresponding plurality of calls, from a central instance (known as third-party call control).

In addition to these fundamental possible distinctions, programming interfaces (application programming interface, API) and protocols are often also used for the specification of CTI solutions. The programming interfaces represent the interfaces to the CTI applications running on the respective computer, and, given the client/server solution, are applied directly to the respectively used CTI server. Known types of CTI programming interfaces include TAPI (Telephony Application Programming Interface) and TSAPI (Telephony Services Application Programming Interface). In addition to CTI servers having only one programming interface, CTI servers with a plurality of these programming interfaces are also known. A known CTI protocol is what is known as CSTA (Computer Supported Telecommunications Applications), which is supported by many manufacturers of telecommunication equipment for the use of CTI servers.

In CTI systems, CTI applications represent the interface to the user of the CTI system. As a rule, these CTI applications are auxiliary programs running on the respective computer, which can be used on one hand by the user and which on the other hand are connected directly with the corresponding telephone terminal device or with the CTI server through the previously described programming interfaces. These CTI applications are as a rule capable of managing call numbers or, respectively, accessing existing address inventories (with corresponding call numbers) and starting other applications. In addition, they offer the possibility of being controlled remotely by other programs running on the computer, through the transmission of call numbers to be dialed via what are known as DDE (Dynamic Data Exchange) functions. With the introduction of the TAPI interface in Windows technology, particular programs are also capable of accessing the respectively connected telephone terminal device themselves, whereby as a rule the further processing of a call is left to the individual CTI applications.

As can be learned from the above description, in CTI systems the capability of dialing call numbers via a computer (personal computer, PC) is currently limited to the respective CTI applications themselves, or to auxiliary programs that either have a direct access to the TAPI interface or that can remotely control the CTI applications with the aid of the DDE functions. Call numbers that are present in arbitrary other applications (for example, word processing programs or databases) can be used for dialing and for setting up a telecommunication connection only with difficulty—for example, in Windows, through the use of what is known as the intermediate clipboard function—or else not at all. The same holds for name and address information, which can be coupled with corresponding call number information if necessary.

SUMMARY OF THE INVENTION

The present invention is thus based on an object of providing a method as well as a corresponding CTI system in order to enable application-independent access to items of information that are relevant for dialing a call number, and to enable further processing of these items of information.

According to the present invention, this object is achieved by a method for determining and processing items of information that are relevant for setting up a telephone connection in a CTI system, comprising the steps: a) selecting by a user of an arbitrary character string shown on display means of computing means of the CTI system, b) automatically evaluating the character string selected in said selecting process, and c) automatically processing, dependent on a result of the evaluation carried out in step b), of the selected character string, according to a particular processing function of the CTI system. A CTI system is also provided, comprising: telecommunication apparatus for setting up a telecommunication connection, and a computer coupled with the telecommunication apparatus to control or monitor the telecommunication apparatus, the computer including: a selector for selection by a user of an arbitrary character string shown on a display of the computer, a control for automatic evaluation of the character string selected by the user, and a processor in order to subject the selected character string automatically to a particular processing function of the CTI system. Advantageous and preferred exemplary embodiments of the present invention enable access to or, respectively, corresponding processing of items of information that are relevant for setting up a telecommunication connection, in a manner that is as simple as possible and that encompasses as many applications as possible. In particular, the method provides that the character string is selected by the user by marking the character string. Further, in step b, the content of the character string selected in step a) is checked automatically for relevance for a call number dialing in the CTI system, and, if a lack of relevance is determined, an inputting possibility for the inputting of a new character string by the user is automatically provided, whereby a newly inputted character string is subsequently subjected to steps b) and c), instead of the character string originally selected in step a).

The method is further characterized in that the inputting possibility for the inputting of a new character string is provided in the form of an input window on the display means of the computing means of the CTI system. In step b), the relevance of the character string for a call number dialing in the CTI system is judged in that, given a character string comprising a string of numerals, it is checked automatically whether the string of numerals can possibly be a call number for the CTI system, and in that, given a character string comprising a string of letters, it is automatically checked whether the string of letters can possibly be a name or address for the CTI system. In step c), the selected character string is subjected to various processing functions, dependent on the content of the character string. Specifically, the processing functions of the CTI system can be freely configured by the user.

According to the foregoing, in step c), for the case in which the selected character string comprises a string of numerals, a call number corresponding to this string of numerals is dialed—automatically or after confirmation by the user—via telecommunication means of the CTI system. The call number corresponding to the selected string of numerals is supplied to a telephone interface of the computing means of the CTI system for the dialing of the call number, either automatically or after confirmation by the user. In a preferred embodiment, in step c), for the case in which the selected character string corresponds to an e-mail address, a desired communication is sent to this e-mail address, automatically or after confirmation by the user, via telecommunication means of the CTI system. Inn step c), for the case in which the selected character string comprises a string of letters, a search process is carried out—automatically or after confirmation by the user—in corresponding storage means of the CTI system for an entry corresponding to the respective string of letters, or a new entering of an entry corresponding to the string of letters is carried out to the storage means of the CTI system. In particular, in step c), given successful execution of the search process in the storage means of the CTI system, the call number corresponding to the respective string of letters and stored in the storage means is determined—automatically or after confirmation by the user—and this call number is dialed via telecommunication means of the CTI system. For the case in which, in step c), as a result of the search process a plurality of entries in the storage means of the CTI system matching the respective string of letters has been determined, a selection possibility for the selection of one of the determined entries is provided to the user. In step c), given successful execution of the search process in the storage means of the CTI system, the e-mail address corresponding to the respective string of letters and stored in the storage means is determined automatically or after confirmation by the user - and a communication is sent to this e-mail address via telecommunication means of the CTI system. Dependent on the processing function carried out in step c), a report concerning the execution of the respective processing function is outputted to the computing means of the CTI system. The method further provides that steps b) and c) are carried out by the computing means of the CTI system.

In the CTI system according to the foregoing, the selection means includes input means for marking by the user of the character string to be selected. The control means and processing means of the computing means are fashioned in such a way that they evaluate or, respectively, process the selected character string according to step a) in the method. Specifically, the processing means includes a telephone interface for selecting a call number via the telecommunication means. The processing means of one embodiment includes an interface for accessing storage means of the CTI system, whereby the storage means store a multiplicity of items of information that are relevant for a call number dialing. The processing means has an interface for sending an e-mail to a particular e-mail address via the telecommunication means.

The basic principle of the present invention is essentially that a user of the CTI system first recognizes and selects a relevant character string (string) on the display screen of the computer of the CTI system, which can in particular take place through marking of this relevant character string. Subsequently, the content of the marked character string is read and evaluated, whereby, dependent on whether the marked character string contains numerals or letters or a combination of numerals and letters, various processing functions of the CTI system are applied with respect to the marked character string, so that for example upon recognition of a string of numerals an item of dialing information can be derived therefrom, and the automatic dialing of the call number can be carried out via the existing telephone interface. Upon recognition of a string of letters, via an existing interface to an index server (directory server) a search can be carried out for this string of letters as a name entry in the database of the directory server, which can store a plurality of electronic address books with corresponding call number entries. If the directory server reports back a string of numerals (a numeral string) that is relevant for an item of dialing information, according to a preferred exemplary embodiment this string is handled in exactly the same manner as a string of numerals marked by the user, and a corresponding control command for dialing the call number corresponding to the string of numerals is given to the telephone interface.

The present invention is completely independent of the type of CTI system used and of the respectively used CTI application running on the computer of the CTI system. Accordingly, the present invention can be used both on CTI systems with individual telephone terminal devices and also on CTI systems with client/server solutions. As a result of the present invention, it is possible for a user to set up a telephone connection, or, respectively, to start an address query to a directory server, independent of the application currently in use, directly from the computer or display screen workstation of the CTI system. Advantageously, in the present invention standard interfaces of the type TAPI and LDAP (Lightweight Directory Access Protocol) are used, offering numerous application possibilities to the user. The present invention enables the realization of comprehensive solutions in the CTI area, which can for example also include call number dialing from Internet browsers.

BRIEF DESCRIPTION OF THE DRAWINGS

In the following, the present invention is explained in more detail on the basis of a preferred exemplary embodiment of the present invention, with reference to the attached drawing.

FIG. 1 shows a functional block diagram of a preferred exemplary embodiment of a CTI system according to the present invention, FIG. 2 shows a functional block diagram of a detail of the computer arrangement used in the CTI system shown in FIG. 1, FIGS. 3a and 3b show a flow diagram corresponding to a preferred exemplary embodiment of the inventive method, and FIGS. 4 and 5 show various display screen outputs on the computer shown in FIGS. 1 and 2 of the inventive CTI system, with the use of the inventive method shown in FIGS. 3a and 3b.

DETAILED DESCRIPTION OF THE PREFERRED EMBODIMENTS

FIG. 1 shows an example of the design of a CTI system according to the present invention, whereby, in particular, in FIG. 1 the design of a CTI system according to what is called the client/server solution is shown schematically. However, the present invention can of course also be applied to other CTI systems, thus for example also to a CTI system in which a computer is coupled directly with a telephone terminal device.

As shown in FIG. 1, a computer (such as a personal computer, PC) or a computer arrangement is connected, via a local network (such as a local area network, LAN) 3 or via a local network connection, with a CTI server 2, which is in turn coupled directly with a telecommunication installation 1. In addition, a directory server 5 can be connected to the local network 3, which server can for example store, in the form of a database, a plurality of electronic address books containing a plurality of name, address, and call number entries. With the aid of the computer 4, on the one hand the setting up of telephone connections via the telecommunication installation 1 can be controlled (for example, automatic call number dialing, call monitoring, and call forwarding), and on the other hand items of information transmitted via the telecommunication installation 1 can be processed, so that a computer-controlled data transmission, speech recognition, or tone production, etc., is possible. In addition, with the aid of the computer 4 the address books of the index server 5 can be accessed in order to enable automatic dialing of desired call numbers via the telecommunication installation 1, dependent on the entries stored in these address books.

FIG. 2 schematically shows a detailed view of the parts of the computer 4 shown in FIG. 1 that are relevant to the present invention. On one hand, a monitor or display screen 11 is connected to the computer 4, and on the other hand a keyboard 6 and a mouse 7 are connected to the computer 4. The use of additional external control devices, such as for example the use of what is known as a trackball or touchpad, is likewise possible. In addition, the computer 4 has a central control module 8, which is advantageously realized as software in the form of an application program that runs under the Windows operating system. This control module 8 represents the connection between the external computer units 5–7 and existing interfaces 9 and 10. According to FIG. 2, the computer 4 has for example two different application interfaces. However, it is of course also possible to use a different number of application interfaces. The interface 9 is for example a standard telephone interface, realized as software, of the type TAPI (Telephony Application Programming Interface or TSAPI (Telephony Services Application Programming Interface), with the aid of which the setting up of a telephone connection via the telecommunication installation 1 shown in FIG. 1 can be initiated, on the basis of provided items of dialing information. In contrast, the interface 10 is a standard interface, realized as software, to the protocol LDAP (Lightweight Directory Access Protocol), with the aid of which the directory server 5 shown in FIG. 1, or, respectively, the address databases thereof, can be accessed. Of course, the use of other or additional interfaces is also possible, whereby a particularly broad range of applications can be realized by means of the support of open interfaces.

The computer 4, or, respectively, the control module 8 implemented thereon and shown in FIG. 2, as well as the interfaces 9 and 10 coupled therewith, are fashioned in such a way that they enable a determination and further processing of items of information that are relevant for the setting up of a telephone connection via the CTI system shown in FIG. 1, according to the method shown in FIG. 3a and 3b. In the following, this is explained in more detail on the basis of the flow diagram shown in FIG. 3a and 3b, whereby reference is also made to the representations shown in FIGS. 4 and 5.

For the computer and display screen workstation of the computer shown in FIGS. 1 and 2, the method shown in FIG. 3a and 3b enables recognition of a character string that is represented by applications or programs and visualized via the display screen 11 of the computer 4, and enables evaluation of the character string with the aid of the control module 8 shown in FIG. 2, the module corresponding to a special program or, respectively, a special application, in order to subject the character string respectively selected by the user to various processing functions, dependent on its composition or, respectively, its content, with the aid of the interfaces 9 and 10, the recognition and evaluation taking place in a manner that is comprehensive with respect to applications; that is, a manner independent of the application respectively used or of the program running on the computer, and independent of the operating system respectively being used.

The starting point of the method shown in FIG. 3a and 3b is thus the representation of an arbitrary text or, respectively, an arbitrary character string on the display screen 11 of the computer 4 (steps S100, S101), whereby the representation can be effected in particular by an application program running on the computer 4, such as for example a word processing program or the like. FIG. 4a and FIG. 5a show examples of text outputs on the display screen 11 of the computer 4, whereby the text shown in FIG. 4a contains a string of numerals corresponding to a call number, while the text shown in FIG. 5a has the name ("Mustermann" in the example) of a subscriber to be called.

In order to dial the call number shown in FIG. 4a, the user of the computer 4 now marks the corresponding string of numerals (step 102), whereby this can for example take place in the usual manner, in that the input position (cursor) available on the display screen 11 is placed on the character string to be marked, and marking is subsequently confirmed by actuation of a particular key of the keyboard 6 and/or mouse 7 shown in FIG. 2, whereby as a rule the character string designated by the cursor is visually highlighted. This procedure is shown in FIG. 4b. Likewise, the marking of the name "Mustermann" contained in the text shown in FIG. 5a, is of course also possible, which is correspondingly shown in FIG. 5b.

Subsequently, the character string marked by the user, that is, the string of numerals marked in FIG. 4a or, respectively, the string of letters marked in FIG. 5b, is evaluated, and the content of the respectively marked character string is read by the application 2 shown in FIG. 2 and is checked for relevance, in order subsequently to approve this character string for further processing via the interfaces 9 and 10 (see further FIG. 2). After reading the contents of the marked character string, it is thus first checked in step S104 whether the marked character string is relevant at all, or can be relevant, for a call number dialing. Thus, the check carried out in step S104 can for example contain that it has been determined whether a meaningful string of numerals or letters suitable for a call number dialing is present at all. In particular, the check can also take place via the interfaces 9 and 10 shown in FIG. 2, because in this way it can already be determined whether, with the aid of the marked string of numerals (FIG. 4b), a call number dialing is possible at all, or, respectively, whether a corresponding entry in the directory server 5 shown in FIG. 1 is present at all for the marked string of letters (see further FIG. 5b). If in step S104 the marked string of numerals cannot be correctly recognized as a call number, or, respectively, the marked string of letters cannot be correctly recognized as a name, and thus no relevance of the respectively marked string can be determined by the control unit 8 shown in FIG. 2, the control unit 8 opens an input window that represents a help function for the user, in order to enable manual input (via the keyboard 6) of a character string that is corrected if necessary (steps S105 and S106). This input window is shown schematically in FIG. 4d or, respectively, 5d. After the input of a corrected call number or, respectively, of a corrected name, in step S104 the relevance of the thus newly inputted character string is again checked, and is thus made the basis of the subsequent further processing, in place of the originally marked character string.

After the relevance of the present character string has been recognized in step S104, the actual processing of the respective character string takes place. Dependent on its content, the character string can thereby be subjected to various processing functions, that is, a string of numerals can be processed in a different manner than a string of letters, resulting accordingly in different processes in the CTI system.

Preferably, the further processing is freely configurable for the user, that is, the user can for example define the programming of the computer 4, how the respectively marked character string is to be further processed dependent on its respective content. In this connection, the use of a context-dependent selection menu for the further processing of the respectively marked string is in particular conceivable.

In the present case, according to FIG. 3b it is first determined whether the marked and read character string is a string of numerals or a string of letters (step S107). If it is a string of numerals, the control unit 8 shown in FIG. 2 hands over these numerals as dialing information to the standard telephone interface (TAPI) 9 implemented in the computer 4; if warranted, this can take place after receiving additional user-dependent items of control information (which can be inputted via the keyboard 6 or the mouse 7, etc.) (step S114).

This standard telephone interface 9, realized as software, can now initiate the setting up of a corresponding telephone connection, that is, can dial the corresponding call number (step S115), via the telecommunication installation 1 shown in FIG. 1, either automatically or after a confirmation by the user, on the basis of the available dialing information corresponding to the string of numerals originally marked by the user (cf. FIG. 5b). A corresponding notification subsequently takes place on the display screen 11 of the computer 4 (step S116), which is shown as an example in FIG. 5c.

In contrast, if in step S107 it was recognized that the present character string is a string of letters, a different processing of this string of letters takes place. First, the string of letters is handed over by the application 8, shown in FIG. 2, to the LDAP interface 10, likewise shown in FIG. 2, which subjects this string of letters to a search operation on the databases of the directory server 5 shown in FIG. 1. In the present case, the function of the application 8 and of the LDAP interface 10 is configured in such a way that, given the presence of a string of letters, after receiving additional user-dependent items of control information the LDAP interface 10 carries out a name search in the address books of the directory server 5 (steps S108 and S109); that is, with the aid of the LDAP interface 10 a corresponding search request to the directory server 5 is started. With the aid of the previously described additional items of control information, which can be inputted by a user via the keyboard 6 or mouse 7, etc., it can for example be determined that searching is to take place only in a particular address book of the directory server 5, or that the marked name is to be admitted as a new entry in a particular address book of the directory server 5. With the aid of the search process in step S109, for example call number entries or e-mail address entries, etc., corresponding to the marked name can be determined on the directory server 5.

Likewise, the activation of a dialing function is possible such that, with the aid of the computer 4, when a corresponding entry is found in the directory server 5, the call number corresponding to the marked name is read out and a corresponding call process is introduced. This is explained in more detail below in relation to steps S113–S115. As already explained, the processing functions can advantageously be set and varied at will via a menu shown on the display screen 11 of the computer 4.

As is shown in FIG. 3b, after a search process it is checked, in a step S110, whether a plurality of entries that match the marked letter string have been determined on the directory server 5. If this is the case, a selection window is opened on the display screen 11 (step S111), in which all the determined entries are shown. By actuation of the keyboard 6 or mouse 7, the user can subsequently select a desired entry from the displayed entries (step S112), whereby the henceforth selected entry of the user is made the basis of the further processing. As is shown in FIG. 5b, in the example shown in FIG. 5 only the text component "Mustermann" has been marked. In step S109, a plurality of matching entries having different first names were thus determined in the database of the directory server 5, the entries being subsequently displayed in the form of a selection window, according to step S111. This is shown in FIG. 5e. The user can thus for example select the desired target subscriber "Max Mustermann," so that the computer 4 can subsequently initiate a call to this subscriber.

In step S113 it is checked whether the dialing function already described above has been activated by the user. If this is the case, and if a corresponding call number for the selected string of letters has been reported back, in the form of an item of dialing information, by the directory server 5 in step S109, the control unit 8 shown in FIG. 2 forwards this item of dialing information to the standard telephone interface (TAPI interface) 9 (step S114), so that in step S115 the corresponding call number can be selected, analogous to the case of a marked string of numerals (cf. FIG. 4). In the situation shown in FIG. 5e, it is thus possible to select a desired subscriber from the entries determined in step S109, and at the same time to call this subscriber in a simple manner, since in step S109, together with the matching entries, the call numbers stored in the database of the directory server 5 have also been reported back.

However, if in step S113 the non-activation of the dialing function was determined, no automatic call number dialing of steps S114 and S115 takes place, and, in step S116, a reporting back to the LDAP interface 10 is indicated directly on the display screen 11—circumventing the TAPI interface 9—via the termination of the search process carried out in step S109. If, in contrast, steps S114 and S115 were executed, in step S116 a reporting back of the TAPI interface 9 takes place via the executed call number dialing. The method procedure is subsequently terminated (step S117), and by marking a new character string on the display screen it is possible to begin again from the beginning.

Alternatively, the use of an MAPI interface is also conceivable, so that after a marking of a character string by the user, an e-mail address corresponding to the marked character string is recognized and evaluated automatically or after confirmation by the user, in order to enable transmission of an e-mail to an e-mail recipient corresponding to the marked character string. Likewise, analogous to the case described above, after the user has marked a particular name a search can take place in a directory server for a corresponding e-mail address entry, in order to enable automatic sending of the e-mail after an entry has been found. In FIG. 3b, additional steps S118 and S119 are shown correspondingly in broken lines. Thus, for example, after execution of the step S113, in the step S118 it can be checked whether the e-mail function has been activated. If this is the case, the e-mail address possibly determined in the step S109 for the marked character string is handed over to an MAPI interface of the computer 4, which interface subsequently carries out a desired communication (e-mail) to the recipient specified by the e-mail address.

Of course, the direct recognition of a marked e-mail address is also possible. Thus, analogous to the steps S107, S114, and S115, corresponding steps can be provided for the recognition of a marked e-mail address, the handing over of the e-mail address to the MAPI interface, and the transmission of the desired e-mail via the MAPI interface.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for determining and processing items of information that are relevant for setting up a telephone connection in a CTI system, comprising the steps:
   a) selecting by a user of an arbitrary character string shown on a display of computing apparatus of the CTI system by an arbitrary application program,
   b) automatically reading in of the character string selected in said selecting process by a separate application program for the reading in the character string in a manner that is comprehensive with respect to applications of arbitrary character strings shown on said display,
   c) checking of said character string by said separate application program with respect to the relevance of said character string for a setting up of a telephone connection, and
   d) in case of a positive check result, initiating a telephone connection by said separate application program by said character string.

2. A method according to claim 1, wherein
in step a) the arbitrary character string is selected by the user by marking the character string.

3. A method according to claim 1, wherein
in step b),
   automatically checking content of the character string selected in step a) for relevance for a call number dialing in the CTI system, and,
   automatically providing a possibility of input of a new character string by the user if a lack of relevance is determined,
performing steps b) and c) on a newly inputted character string instead of the character string originally selected in step a).

4. A method according to claim 3, further comprising the step of:
providing an input window on the display of a computer of the CTI system in which to input a new character string.

5. A method according to claim 3, wherein
in step b), determining relevance of the character string for a call number dialing in the CTI system, includes:
   given a character string comprising a string of numerals, checking whether the string of numerals can possibly be a call number for the CTI system, and
   given a character string comprising a string of letters, checking whether the string of letters can possibly be a name or address for the CTI system.

6. A method as claimed in claim 1, wherein
in step c), subjecting the selected character string to various processing functions, dependent on content of the character string.

7. A method according to claim 6, further comprising the step of:
providing processing functions of the CTI system that can be freely configured by the user.

8. A method according to claim 1, wherein
in step d), for a case in which the selected character string comprises a string of numerals, dialing a call number corresponding to said string of numerals via telecommunication apparatus of the CTI system.

9. A method according to claim 8, further comprising the step of:
supplying a call number corresponding to the selected string of numerals to a telephone interface of a computer of the CTI system for the dialing of the call number.

10. A method according to claim 1, wherein
in step d), for a case in which the selected character string corresponds to an e-mail address, sending a desired communication to said e-mail address via a telecommunication apparatus of the CTI system.

11. A method according to claim 1, wherein
in step c), for a case in which the selected character string comprises a string of letters, carrying out a search process initiated by said separate application program in a corresponding storage of the CTI system for one of an entry corresponding to the respective string of letters and a new entry corresponding to the string of letters into the storage is initiated by the separate application program.

12. A method according to claim 11, wherein
in step d), given successful execution of the search process in the storage of the CTI system, determining a call number corresponding to the respective string of letters and stored in the storage and dialing said call number via a telecommunication apparatus of the CTI system.

13. A method according to claim 11, wherein
in step d), for a case that a plurality of entries matching the string of letters is found in the storage of the CTI system in said search process, providing a selection possibility for selection of one of the determined entries to the user.

14. A method according to claim 11, wherein
in step d), given successful execution of the search process in the storage of the CTI system, determining an e-mail address corresponding to the respective string of letters and stored in the storage and sending a communication to said e-mail address via telecommunication apparatus of the CTI system.

15. A method according to claim 6, further comprising the step of:
outputting a report concerning the execution of the respective processing function.

16. A method according to claim 1, wherein
steps b) and c) are carried out by the computer of the CTI system.

17. A CTI system, comprising:
a telecommunication apparatus for setting up a telecommunication connection, and
a computer coupled with the telecommunication apparatus to control or monitor the telecommunication apparatus, the computer including:
   a selector for selection by a user of an arbitrary character string shown on a display of the computer by an arbitrary application program,
   a separate application program for automatic reading in of arbitrary character strings shown on the display in a manner that is comprehensive to the applications, and for checking selected character strings with respect to their relevance for setting up a telephone connection, and
   a processor to initiate a setting up of a telephone connection by the selected character string given a positive check result.

18. A CTI system according to claim 17, wherein said selector includes a character string marker for marking by the user of the character string to be selected.

19. A CTI system according to claim 17, wherein said controller and said processor are fashioned in such a way as to one of evaluate and process the selected character string by:
   a) selecting by a user of an arbitrary character string shown on display means of computing means of the CTI system,
   b) automatically evaluating the character string selected in said selecting process, and
   c) automatically processing, dependent on a result of the evaluation carried out in step b), of the selected character string, according to a particular processing function of the CTI system.

20. A CTI system according to claim 17, wherein the processor includes a telephone interface for selecting a call number via the telecommunication means.

21. A CTI system according to claim 17, wherein said processor includes: an interface for accessing said storage of the CTI system, said storage storing a multiplicity of items of information that are relevant for a call number dialing.

22. A CTI system according to claim 17, wherein said processor includes an interface for sending an e-mail to a particular e-mail address via the telecommunication apparatus.

* * * * *